UNITED STATES PATENT OFFICE.

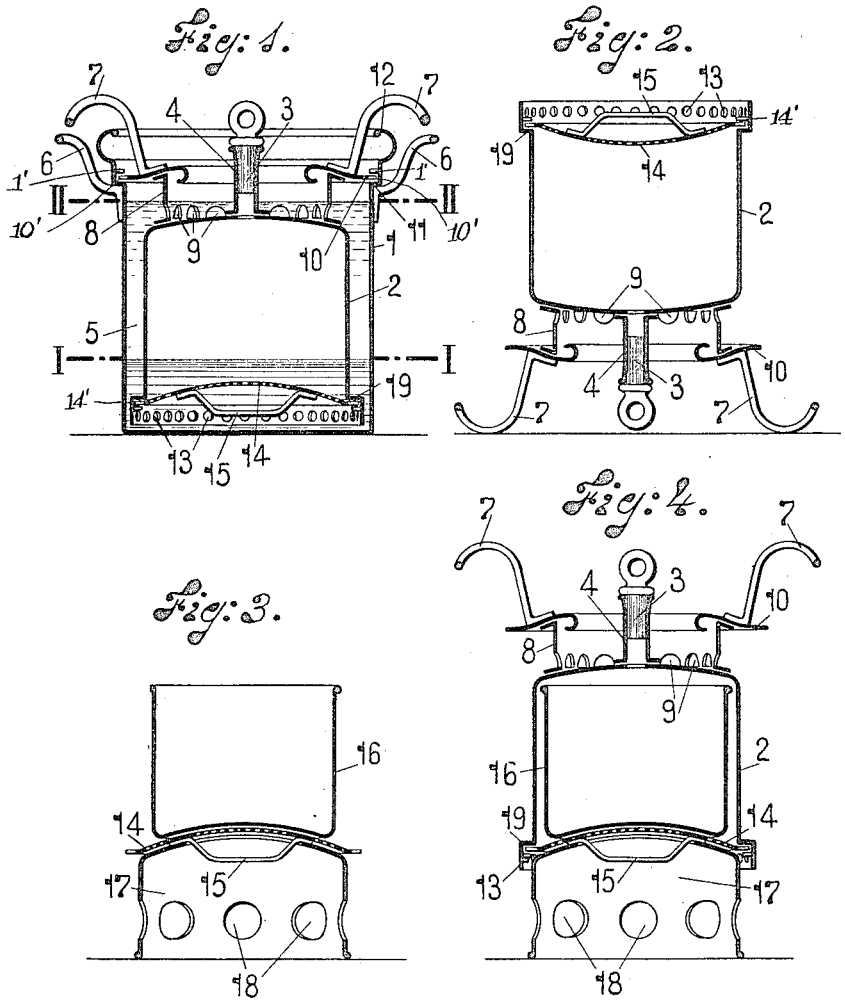

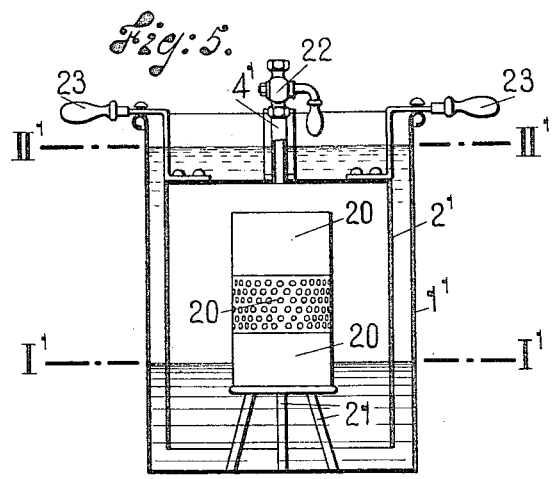

ABRAHAM JOHANNES van STOCKUM, OF AMSTERDAM, NETHERLANDS.

COOKING AND FOOD-STERILIZING APPARATUS.

1,223,748.

Specification of Letters Patent.

Patented Apr. 24, 1917.

Application filed October 18, 1913. Serial No. 795,904.

*To all whom it may concern:*

Be it known that I, ABRAHAM JOHANNES VAN STOCKUM, subject of the Queen of the Netherlands, residing at Amsterdam, Netherlands, have invented certain new and useful Improvements in Cooking and Food-Sterilizing Apparatus, of which the following is a specification.

The object of this invention is to provide apparatus whereby food can be cooked and sterilized by means of saturated steam which is at a pressure fully equal to that of the atmosphere, and at a temperature fully equal to that of boiling water at the said pressure. One advantage aimed at by this means is to enable food to be cooked more quickly and cheaply than in steam-cookers in which it is surrounded by steam at a pressure and temperature below the pressure and temperature of saturated steam. In cooking apparatus heretofore known always the top side of the bell in which the foods are steamed is directly exposed to the atmosphere. So a radiation of heat and consequently a fall of temperature, condensation and fall of pressure will occur within the bell, so that the pressure corresponding to the temperature of the developing steam is lower than the pressure corresponding to the same temperature of saturated steam. The bell of the apparatus according to the invention, however, is fully submerged in the boiling water, so that its top side can practically not radiate heat. Another advantage aimed at is to enable food, which absorbs a large proportion of water during the cooking, for example rice, to be cooked without the addition of water and to be obtained, when finished, in a state of adequate dryness, the right amount of moisture having been absorbed by the food from the saturated steam.

One embodiment of the invention is shown in Figures 1 to 4 of the accompanying drawing, in which—

Fig. 1 is a vertical section of the apparatus,

Fig. 2 a vertical section of the inner part thereof, inverted,

Fig. 3 a sectional view showing part of the apparatus detached, and

Fig. 4 a sectional view showing part of the apparatus in course of being assembled.

Fig. 5 is a vertical section showing a modification.

The apparatus, as shown in Fig. 1, comprises a vessel 1 open at the top, and within this vessel an inverted vessel 2, which has a tubular neck 4 at the top, closed by a plug 3. Between the walls of the vessels 1 and 2 there is an annular space 5, and the vessel 2 is fixed in the vessel 1 by means of lugs 1' secured within the mouth of the vessel 1 and coöperating with the edge of the flange 10 and notches 10' therein to form a bayonet joint, its rim at the bottom being clear of the floor of the vessel 1. The vessels 1 and 2 have handles 6 and 7 respectively, and when the parts are assembled as shown in Fig. 1 the handles 6 and 7 at each side lie closely together, so that they can be gripped collectively. To the top of the vessel 2 is fixed a circular wall 8, having holes 9 at the bottom and a flange 10 at the top, the flange 10 resting, as shown in Fig. 1, on a ledge 11 formed by the wall of the vessel 1. By turning the vessel 2 the flange 10 is engaged with the vessel 1 and thus fixes the vessel 2 in the vessel 1. The flange 10 also extends inward from the wall 8, and is curved downward over the space within the wall, in order to prevent water from splashing out of the said space. For a similar purpose the wall of the vessel 1 is curved inward at 12, above the ledge 11. The vessel 2 has an enlargement at its lower part, and its wall is provided with holes 13. A perforated concavo-convex cover plate 14 is fitted into the vessel 2, near the bottom thereof, and has a depending handle 15 fixed to its concave under-side, the whole of the said handle lying above the level of the bottom rim of the vessel 2. The plate 14 is fixed by means of a bayonet joint 14' to the ledge 19 formed where the enlargement of the vessel 2 begins.

The handles 7, which are fixed to the flange 10, are bent outward, so that they are adapted to form feet, with a wide base, for supporting the vessel 2 when the same is removed from the vessel 1 and inverted, as shown in Fig. 2.

Fig. 3 shows the cover plate 14 detached from the vessel 2 and resting on a temporary support or foot 17, which has holes 18 in its wall and a slot at the top, for entrance of the handle 15. The cover plate supports a cooking vessel 16.

Fig. 4 shows the inverted vessel 2 placed over the vessel 16 and attached to the plate 14, the attachment being effected by turning the vessel 2 to engage the bayonet joint, while the foot 17 is held fast by hand, the holes 18 enabling a firm grip to be obtained. The inverted vessel 2, with the vessel 16 therein, is then lifted into the vessel 1.

I will now describe the manner of using the apparatus as applied to the cooking of rice.

Assuming the parts to be assembled as shown in Fig. 1, the vessel 2 is lifted out of the vessel 1 and turned into the position shown in Fig. 2. The cover 14 is then removed, and the rice is placed in the vessel 2, whereupon the cover is replaced. The vessel 1 is filled with water to approximately the level indicated by the line I—I in Fig. 1, and the vessel 2, inverted, is returned to the vessel 1, the plug 3 being then removed. Water rises in the vessel 2, and mingles with the rice. The apparatus is then heated, and the rice is boiled in the water for about 5 minutes, whereby it is thoroughly washed, the grains being still too hard to absorb dust and the like. The air over the rice is expelled, in the course of the boiling, by steam, and the plug 3 is then re-inserted, to make a steam-tight joint. When this has been done the steam-pressure in the vessel 2 rises and expels water from the vessel into the space 5, the water rising to approximately the level indicated by the line II—II, so that the vessel 2 is entirely surrounded by boiling water, and no condensation of steam can take place in the vessel. The pressure in the vessel 2 is equal to atmospheric pressure plus the pressure of the water column extending from the holes 13 to the level II—II, so that the temperature in the vessel 2 exceeds the normal boiling point, and the rice is thus quickly cooked under conditions which render it more wholesome and better flavored than rice cooked at the ordinary temperature.

Other foods are cooked in a similar manner, the treatment being varied, of course, according to their nature, in regard to the length of the period of boiling prior to insertion of the plug 3, and so on. If the food is in a liquid state, or is a vegetable or the like which can be more conveniently cooked in the vessel 16, the latter is placed in the vessel 2 in the manner described. Jars of preserves and the like may also be placed on the cover 14 in the same way.

Fig. 5 shows a modification wherein the inner, inverted vessel, designated $2^1$, has no cover at the bottom and is supported in the outer vessel, designated $1^1$, by means of handles 23 which rest on the rim of the vessel $1^1$ and are engaged therewith by means of bayonet joints. The neck $4^1$ of the vessel $2^1$ is fitted with a valve 22, which is closed by hand to retain steam in the vessel. The vessel $2^1$ is inverted over a tripod 21 in the vessel $1^1$. On this tripod are placed the vessels containing the food to be cooked; Fig. 5 shows three such vessels, designated 20, placed one upon the other. These vessels 20 may be perforated or imperforate, according to the nature of the food and the treatment which is required.

The action is the same as that of the form of devices shown in Figs. 1 and 4, the water being forced, by steam trapped in the vessel $2^1$, from the level $I^1$—$I^1$ to the level $II^1$—$II^1$, so that it entirely surrounds the vessel $2^1$ after the closing of the valve 22.

What I claim as my invention and desire to secure by Letters Patent of the United States is:—

1. A steam-cooker and sterilizing appliance comprising in combination an outer vessel, an inner inverted vessel, a tubular neck rising from the top of said inner vessel, means for closing said tubular neck, and means for fixing said inner vessel in said outer vessel whereby the bottom edge of said inner vessel is held clear of the floor of said outer vessel, the wall of the latter rising above the top of the inner vessel.

2. A steam-cooker and sterilizing appliance comprising in combination an outer vessel, an inner inverted vessel, a tubular neck rising from the top of said inner vessel, means for closing said tubular neck, means for supporting food in said inverted vessel, and means for fixing said inner vessel in said outer vessel whereby the bottom edge of said inner vessel is held clear of the floor of said outer vessel, the wall of the latter rising above the top of the inner vessel.

3. A steam-cooker and sterilizing appliance comprising in combination an outer vessel, an inner inverted vessel, a tubular neck rising from the top of said inner vessel, means for closing said tubular neck, a detachable perforated cover at the lower part of said inverted vessel, and means for fixing said inner vessel in said outer vessel whereby the bottom edge of said inner vessel is held clear of the floor of said outer vessel, the wall of the latter rising above the top of the inner vessel.

4. A steam-cooker and sterilizing appliance comprising in combination an outer vessel, an inner inverted vessel, a tubular neck arising from the top of said inner vessel, means for closing said tubular neck, a detachable perforated cover at the lower part of said inverted vessel, a pendent handle fixed to said cover, and means for fixing said inner vessel in said outer vessel whereby the bottom edge of said inner vessel is held clear of the floor of said outer vessel, the wall of the latter rising above the top of the inner vessel.

5. A steam-cooker and sterilizing appliance comprising in combination a single outer vessel, a single inner inverted vessel, a tubular neck rising from the top of said inner vessel, means for closing said tubular neck, a detachable perforated cover at the lower part of said inverted vessel, and means for fixing said inner vessel in said outer vessel whereby the bottom edge of said inner vessel is held clear of the floor of said outer vessel, the wall of the latter rising above the top of the inner vessel.

6. A steam-cooker and sterilizing appliance comprising in combination an outer vessel, an inner inverted vessel, a detachable perforated cover at the lower part of said inverted vessel, and means for fixing said inner vessel in said outer vessel whereby the bottom edge of said inner vessel is held clear of the floor of said outer vessel, the wall of the latter rising above the top of the inner vessel.

7. A steam-cooker and sterilizing appliance comprising in combination an outer vessel, an inner inverted vessel, a tubular neck rising from the top of said inner vessel, means for closing said tubular neck, a detachable perforated cover, and means for fixing said inner vessel in said outer vessel whereby the bottom edge of said inner vessel is held clear of the floor of said outer vessel, the wall of the latter rising above the top of the inner vessel.

8. A steam-cooker and sterilizing appliance comprising in combination a single outer vessel, a single inner inverted vessel; a tubular neck rising from the top of said inner vessel, means for closing said tubular neck, and means for fixing said inner vessel in said outer vessel whereby the bottom edge of said inner vessel is held clear of the floor of said outer vessel, the wall of the latter rising above the top of the inner vessel.

9. In a steam cooker, the combination of a vessel open at the bottom and adapted to be placed in another vessel; a perforated cover secured in said open bottom by a bayonet joint connection; a handle disposed across the lower face of the cover; and a foot adapted to support said cover with the vessel secured thereto and provided with a slot adapted to receive said handle.

10. In a steam cooker, the combination of a vessel open at the bottom and adapted to be placed in another vessel; a perforated cover secured in said open bottom by a bayonet joint connection; a handle disposed across the lower face of the cover; a foot adapted to support said cover with the vessel secured thereto and provided with a slot adapted to receive said handle and an additional vessel open at the top and closed at the bottom resting on said cover.

In testimony whereof I have hereunto set my hand in presence of two subscribing witnesses.

ABRAHAM JOHANNES van STOCKUM.

Witnesses:
THOMAS H. VERHAVE,
P. HILDERNY.

Copies of this patent may be obtained for five cents each, by addressing the "Commissioner of Patents, Washington, D. C."